ically detecting and controlling the furnace operating condition of an arc-furnace at the charge melting stage in which said melting stage is further divided into the first period, boring down period, establishing period of a small pool of liquid, shielded arc period and flat bath period; the first period, boring down period and establishing period of a small pool of liquid are respectively detected by first detecting means based upon electrode position and lowermost electrode position indicating signals; and the shielded arc and flat bath periods are detected respectively by the power consumption after the start signal of establishing period of a small pool of liquid has been derived and by detecting means to be energized by said signals and the signal representing the arc impedance.

United States Patent

[11] 3,588,306

[72] Inventor Morihiko Kawabe
Yokohama-shi, Japan
[21] Appl. No. 883,003
[22] Filed Dec. 8, 1969
[45] Patented June 28, 1971
[73] Assignee Ishikawajima-Harima Jukogyo Kabushiki Kaisha
Tokyo-to, Japan
[32] Priority Feb. 20, 1969
[33] Japan
[31] 44/12863

[54] METHOD AND SYSTEM FOR AUTOMATICALLY DETECTING AND CONTROLLING FURNACE OPERATING CONDITION OF ARC-FURNACE AT CHARGE MELTING STAGE
2 Claims, 6 Drawing Figs.

[52] U.S. Cl. .................................................. 13/13
[51] Int. Cl. .................................................. H05b 1/02, H05b 7/00
[50] Field of Search .......................................... 13/12, 13

[56] References Cited
UNITED STATES PATENTS
3,431,344 3/1969 Borrebach ............... 13/12
3,435,121 3/1969 Jackson ..................... 13/13

Primary Examiner—Bernard A. Gilheany
Assistant Examiner—Roy N. Envall, Jr.
Attorney—Nolte and Nolte ABSTRACT: A system for automatically detecting and controlling the furnace operating condition of an arc-furnace at the charge melting stage in which said melting stage is further divided into the first period, boring down period, establishing period of a small pool of liquid, shielded arc period and flat bath period; the first period, boring down period and establishing period of a small pool of liquid are respectively detected by first detecting means based upon electrode position and lowermost electrode position indicating signals; and the shielded arc and flat bath periods are detected respectively by the power consumption after the start signal of establishing period of a small pool of liquid has been derived and by detecting means to be energized by said signals and the signal representing the arc impedance.

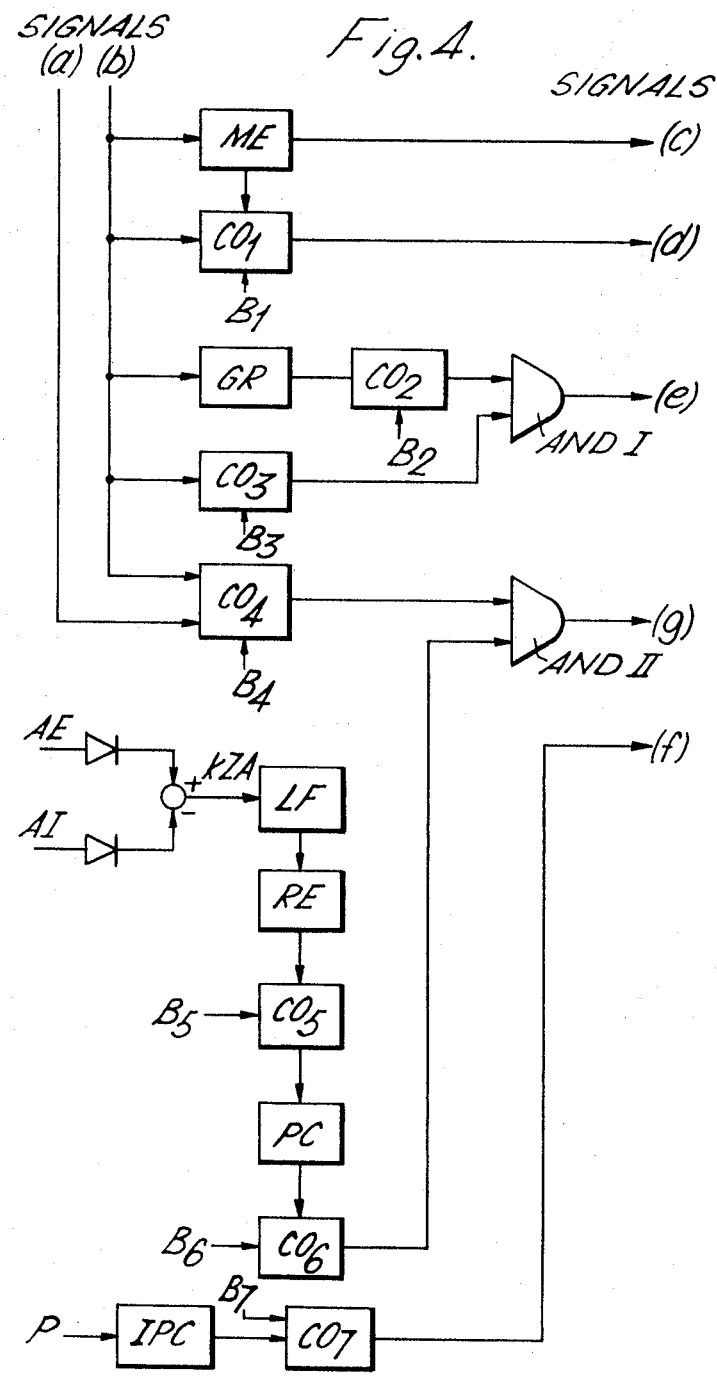

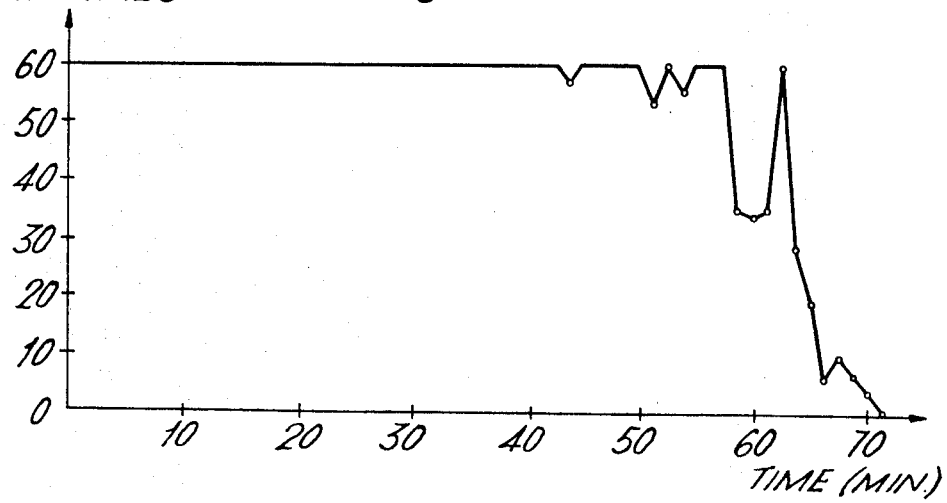
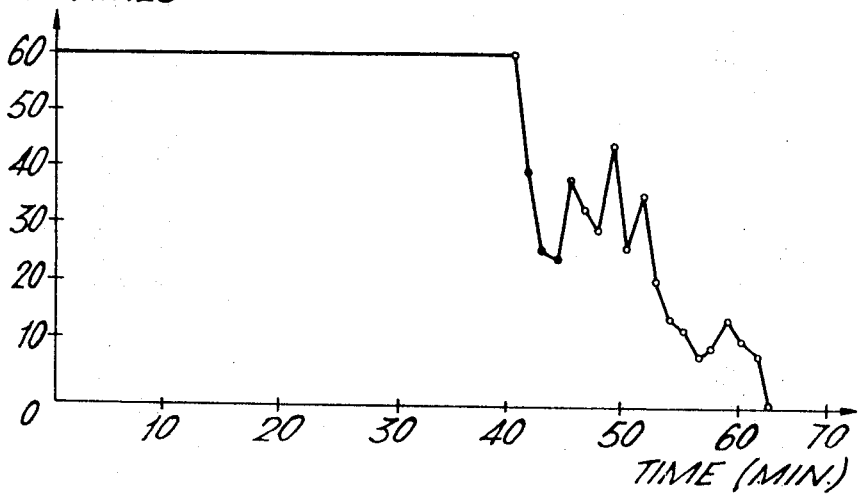

3,588,306

METHOD AND SYSTEM FOR AUTOMATICALLY DETECTING AND CONTROLLING FURNACE OPERATING CONDITION OF ARC-FURNACE AT CHARGE MELTING STAGE

DETAILED EXPLANATION OF THE INVENTION

The present invention relates to a method and system for automatically detecting and controlling the furnace operating condition of an arc-furnace at the charge melting stage.

In the conventional system for regulating the power to be supplied to an arc-furnace at the melting stage, the programmed power supply method is used so that the power may be supplied to the arc-furnace independently of the furnace operating condition or the skilled labor regulates the power supply based upon his experience.

In the programmed power supply method, the electric power is regulated independently of the operating condition when the arc-furnace is once ignited so that the required power cannot be supplied at the desired time and it does harm to the floor and lining of arc-furnace more first. In the latter method in which the skilled labor regulates the power supply, it is very difficult to detect the actual operating condition of the arc-furnace. Both of the above-described methods have the defects in the fact that the power is uneconomically consumed and that the service lives of the arc-furnace itself and the electrical circuit are short.

In order to eliminate such defects as described above the present invention provides a method and system for automatically detecting and controlling the furnace operating condition of an arc-furnace at the charge melting stage characterized by deriving the signals representing the position and the lowermost position of an electrode respectively; transmitting said signal representing the lowermost position of the electrode to detecting means for detecting the first period, boring down period and establishing period of a small pool of liquid respectively, detecting the shielded arc period by means of the power consumed after said establishing period of a small pool of liquid starting signal has been derived; and detecting the flat bath period by detecting means which is energized by said signals representing the position and the lowermost position of the electrode and the signal representing the arc impedance.

The above and other objects, features and advantages of the present invention will become more apparent from the following description of one illustrative embodiment of the present invention with reference to the accompanying drawing.

FIG. 1 is for explanation of the arrangement of a signal deriving member or signal generator for generating the signals indicating the lowermost position of an electrode and of the position of this electrode of an automatic detection and control system for detecting and controlling the arc-furnace operating condition when the charges are started to be melted in accordance with the present invention;

FIG. 4 is a block diagram of an electrical equipment of the system of the present invention; and FIGS. 5 and 6 are graphs of 100-ton and 50-ton arc-furnaces illustrating the number of times per unit time of the arc impedances exceeding the predetermined levels based upon the experiments.

Figure 1:
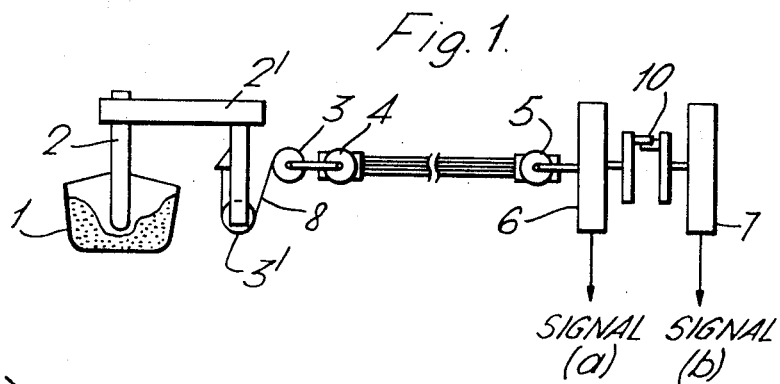

Referring to FIG. 1, the electrode driving, its position and its lowermost position detection device of the present invention comprises an arc-furnace 1, an electrode 2 vertically placed in the furnace 1, a sheave 3' fixed to a support 2' for the electrode 2, a drum 3 for winding therearound through the sheave 3' a length of rope 8 one end of which is fixedly secured to the support 2', a synchronous transmitter 4 and a synchronous receiver 5 which rotate in synchronism with the rotation of the drum 3, a potentiometer 6 directly coupled to the synchronous receiver 5 and another potentiometer 7 driven through a cam 10 by the rotation of the synchronous receiver 5, whereby the electrode 2 may be driven upwardly and downwardly with respect to the arc-furnace 1 through the sheave 3' and the rope 8 by the rotation of the drum 3.

The forward or reverse rotation of the drum 3 has a predetermined functional relationship with the upward or downward movement of the electrode 2 with respect to the arc-furnace 1, that is the position of the electrode 2. Furthermore, the rotation of the drum 3 has a predetermined relationship with both of the synchronous transmitter 4 and receiver 5 and consequently with both of the potentiometers 6 and 7. Therefore, the potentiometer 6 generates the signal $(a)$ representing the position of the electrode 2 whereas the potentiometer 7, the signal $(b)$ representing the lowermost position of the electrode 2.

The electrical system of the automatic detection and control system of the present invention comprises, as shown in FIG. 4, a first group including a memory ME, a comparator $CO_1$, a sampling device GR, a comparator $CO_3$, all of which are coupled in parallel with a lead wire for transmitting the signal $(b)$, a comparator $CO_2$ coupled in series with the sampling device GR, a logic circuit $AND_I$ coupled to both of the comparators $CO_2$ and $CO_3$, and a comparator $CO_4$ coupled to both of the lead wires for transmitting the signals $(a)$ and $(b)$ respectively and to a logic circuit $AND_{II}$ and a second group including an arc impedance circuit $AI_m$ for deriving the signals $kZA$ which are a function of the arc voltage AE and the arc current AI, a third group for transmitting the signals $kZA$ to the logic circuit $AND_{II}$ through low pass filter LF, a rectifier RE, a comparator $CO_5$, a pulse counter PC and a comparator $CO_6$ and a fourth group including an integrating wattmeter for integrating the power P consumed by the arc and a comparator $CO_7$ coupled to the wattmeter.

Figure 2:
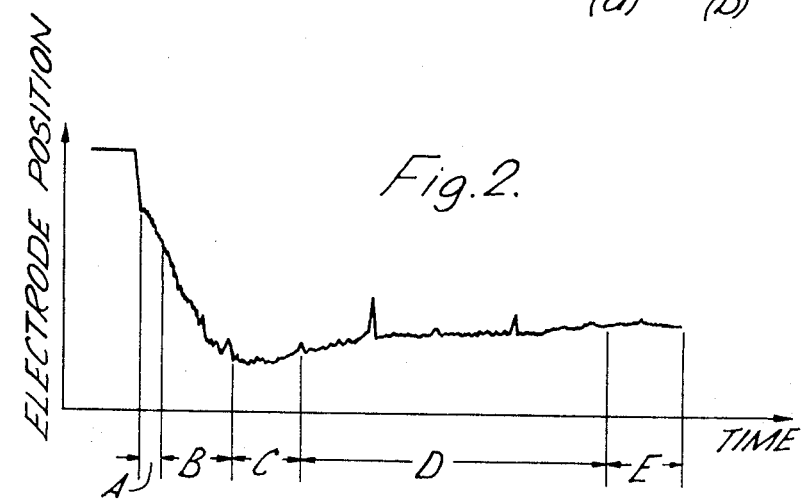
FIGS. 2 and 3 are graphs for explaining the relation between the time and the position of the electrode and the lowermost position thereof when the charges are started to be melted.
Figure 3:
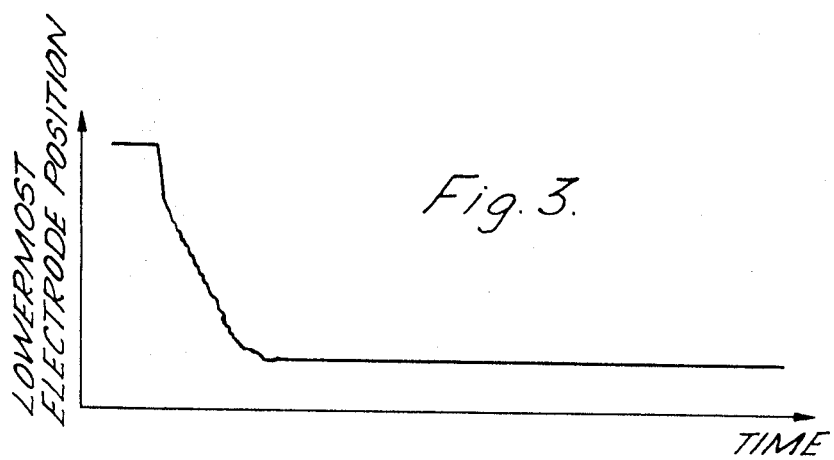

In the automatic detection and control system of the present invention having the above-described arrangement, the relation between the position of the electrode 2 with respect to the arc-furnace 1 and time is illustrated in FIG. 2 while the relation between the lowermost position of the electrode 2 and time is illustrated in FIG. 3. As will be seen from FIG. 2, the position of the electrode 2 can be automatically controlled according to the five arc-furnace operating conditions, that is the first period A, the boring down period B, the establishing period of a small pool of liquid C, the shielded arc period D and the flat bath period E.

For this purpose, the signal $(b)$ representing the lowermost position of the electrode is stored in the memory ME at the ignition stage A where the current starts to flow through the electrode 2, the memory ME deriving the "first period-start" instruction $(c)$.

Next the output signal from the memory ME is compared in the comparator $CO_1$ with the signal $(b)$ representing the lowermost position of the electrode and when the difference between said two signals reaches a predetermined bias (voltage) $B_1$, the comparator $CO_1$ is energized thereby deriving the "boring down period-start" instruction $(d)$. Simultaneously, the signals $(b)$ are stored per unit time in the sampling device GR and the differences among the signals $(b)$ at a predetermined time interval are transmitted to the comparator $CO_2$ so as to compare these differences with a predetermined bias (voltage) $B_2$. When the difference is less than the bias (voltage) $B_2$, the output signal is derived from the comparator $CO_2$. Furthermore, when the signal $(b)$ is less than a predetermined bias (voltage) $B_3$, the comparator $CO_3$ operates, thus deriving the output signal, which is transmitted to the logic circuit $AND_I$ together with the signal from the comparator $CO_2$. In the circuit $AND_I$, "establishing period of a small pool of liquid-start" instruction $(e)$ for starting the establishing period of a small pool of liquid C is derived based upon said two signals.

The power P consumed after the instruction $(e)$ has been derived is integrated by the integrating wattmeter IPC and when the consumed watt-hour reaches a predetermined bias $B_7$, the comparator $CO_7$ generates the "shielded arc period period-start" instruction $(f)$.

In the detection circuit group, after the "shielded arc period-start" instruction has been generated, the voltage signal $kZA$ representing the arc impedance $ZA$ is transmitted to low pass filter LF, then rectified by the rectifier RF and transmitted to the comparator $CO_5$. The number of times of the signals $kZA$ exceeding a predetermined bias (voltage) $B_5$ is represented by pulses in the comparator $CO_5$ and transmitted to the pulse counter PC. The pulse counter PC counts the number of pulses per unit time and when the number of times in which the counted pulses are less than a predetermined number $B_6$ reaches a predetermined number, the comparator $CO_6$ generates the signal to be transmitted to the logic circuit $AND_{II}$.

In the comparator $CO_4$, the signal representing the position of the electrode 2 is compared with that representing the lowermost position of the electrode. When the difference therebetween exceeds a predetermined value $B_4$, the output signal is transmitted to the logic circuit $AND_{II}$. The circuit $AND_{II}$ derives the "flat bath period-start" instruction ($g$) based upon the output signals from the comparators $CO_6$ and $CO_4$.

After the instruction ($g$) has been derived, the tap voltage is reduced in a suitable manner so as to melt down.

FIGS. 5 and 6 illustrate the relation between the time and the number of times when the arc impedance signals exceeded the predetermined bias voltage $B_5$ per minute in the 100- and 50-tons arc-furnace.

According to the system of the present invention, the charge melting process is divided into five stages as described above depending upon the arc-furnace conditions; the biases or predetermined values $B_1$ to $B_7$ are determined for thus divided stages respectively so as to be compared with the output signals from the respective comparators, thereby deriving the instructions for starting the respective divided operation stages, thus regulating the position and the lowermost position of the electrode within the arc-furnace. Thus, the arc-furnace operating condition can be accurately detected without the visual inspection and optimal power supply can be done; the operation of arc-furnace comes to be uniform, regardless of quality and quantity of the scraps; the remarkable economy of the power consumption can be realized as compared with the conventional system; the service lives of the arc-furnace and the electric circuit can be increased; and the labor and the time required for operating the arc-furnace can be further reduced with improved results.

The present invention has been so far described with particular reference to one illustrative embodiment thereof, but it will be understood that variations and modifications can be effected by those skilled in the art without departing from the true spirit of the present invention as described hereinabove and as defined in the appended claims.

I claim:

1. A method for automatically detecting and controlling the furnace operating condition of an arc-furnace at the charge or burden melting stage characterized by deriving the signals representing the position and the lowermost position of an electrode, transmitting said signals to detecting means for detecting the first period, the boring down period and the establishing period of a small pool of liquid respectively, detecting the main melting stage by means of the power consumed after the molten bath forming stage starting signal has been derived, and detecting the flat bath period by detecting means which is energized by said signals representing the position and the lowermost position of said electrode and by the signal representing the arc impedance.

2. An automatic detecting and control system for detecting and controlling the furnace operating condition of an arc-furnace at the charge or burden melting stage characterized by the provision of means for generating the signals representing the position and the lowermost position of an electrode respectively, memory means for receiving said signal representing the lowermost position of said electrode from said signal generating means and storing therein the magnitude of said signal when the arc current starts to flow, a first comparator for comparing said signal representing the lowermost position of said electrode with a predetermined value, thereby deriving the boring down period starting signal, sampling means for storing per unit time said signals representing the lowermost positions of said electrode, a second comparator for comparing the signal from said sampling means with a predetermined value, a third comparator for comparing the signal representing the lowermost position of said electrode with a predetermined value, a first logic circuit for receiving the signal from said second comparator and the signal from said third comparator thereby deriving the establishing period of a small pool of liquid starting signal, a fourth comparator for receiving said signals representing the position and the lowermost position of said electrode, a fifth comparator for receiving the signal representing the arc impedance based upon the arc voltage and current and comparing it with a predetermined value, thereby deriving the pulses representing the number of times when said arc impedance signals exceed said predetermined value, a pulse counter for counting the pulses from said fifth comparator, a sixth comparator for receiving the signal from said pulse counter and comparing it with a predetermined value, a second logic circuit for receiving the signals from said fourth and said sixth comparators, thereby deriving the flat bath period starting signal; and a seventh comparator for deriving the shielded arc period starting signal when the power consumed, after said establishing period of a small pool of liquid starting signal has been derived, coincides with a predetermined value.